United States Patent [19]
Tobe et al.

[11] Patent Number: 4,896,224
[45] Date of Patent: Jan. 23, 1990

[54] VIDEO AND AUDIO SIGNAL RECORDING APPARATUS PROVIDING FOR RECORDATION OF CONTROL DATA WITH AUDIO SIGNALS

[75] Inventors: Kazumitsu Tobe, Chiba; Isao Harigaya, Kanagawa, both of Japan

[73] Assignee: Canon Kabushiki Kaisha, Tokyo, Japan

[21] Appl. No.: 127,441

[22] Filed: Dec. 2, 1987

[30] Foreign Application Priority Data

Dec. 8, 1986 [JP] Japan ................................. 61-290333

[51] Int. Cl.⁴ .............................................. H04N 7/00
[52] U.S. Cl. .................................. 360/19.1; 360/33.1; 358/343
[58] Field of Search ....................... 360/19.1, 33.1, 13; 358/343, 310, 906

[56] References Cited

U.S. PATENT DOCUMENTS 3,974,522  8/1976  Fukatsu et al. ................. 358/906 X
4,303,950 12/1981  Taniguchi et al. ................ 360/19.1
4,477,844 10/1984  Nakano et al. ................ 360/19.1 X
4,575,772  3/1986  Shimada et al. ................ 358/343 X

FOREIGN PATENT DOCUMENTS 60-80173  5/1985  Japan .................................. 360/19.1

Primary Examiner—Aristotelis M. Psitos
Attorney, Agent, or Firm—Robin, Blecker, Daley & Driscoll

[57] ABSTRACT

An apparatus for recording an analog video signal in a longitudinally extending first area of a tape-shaped recording medium and for recording a digital audio signal in a second area of the medium extending in parallel to the first area is arranged: to bring the video and audio signal recording to a stop; to record control data in the second area along with the audio signal immediately before the stop; and to start to record the digital video signal and the analog audio signal when the control data is reproduced from the second area.

12 Claims, 2 Drawing Sheets

VIDEO AND AUDIO SIGNAL RECORDING APPARATUS PROVIDING FOR RECORDATION OF CONTROL DATA WITH AUDIO SIGNALS

BACKGROUND OF THE INVENTION

1. Field of the Invention

This invention relates to a video signal recording apparatus and more particularly to an apparatus for recording a digital audio signal on a tape-shaped recording medium along with an analog video signal.

2. Description of the Related Art

The conventional apparatuses of the above stated kind are described in detail below with a helical scanning type magnetic recording and/or reproducing apparatus (hereinafter referred to as VTR) taken as an example.

Among the conventional VTRs, there have been proposed and made practical VTRs which are arranged to permit the so-called concatenated recording from a desired recording position with an adequate boundary between one scene and another in such a manner that the end of a preceding scene is detected by bringing a recording action to a pause and then by rewinding a tape-shaped recording medium before resuming the recording action. The start position of a concatenated recording operation has been arranged to be found by one of varied methods, including among others: (i) A method of determining recording start timing simply by a tape rewinding speed and the traveling speed of the tape obtained immediately before the start of recording. (ii) A method of determining it by a number of control signals which were recorded along the edge part of the tape in the longitudinal direction of the tape and have been reproduced before rewinding and by a number of the control signals reproduced before a start of recording. (iii) A method of determining it by the numbers of pulses generated by a frequency generator disposed at a capstan motor and is counted when the tape is rewound and counted immediately before a start of recording. (iv) A method of determining it by varying the recording pattern of tracking control pilot signals and by detecting these varied patterns.

In accordance with the method (i) above, in order to prevent any part of each scene from dropping out at a recording end position or at a recording resuming position, it is necessary to provide some allowance for an error in setting the timing. As a result, an overlapped recording amount increases and, in some case, the boundary between one scene and another might appear in an undesired part. In the method (ii), it necessitates use of some area along the edge part of the tape and is not applicable to any apparatus other than a VTR of the kind using an additional head solely for the purpose of recording the control signals. In the case of the method (iii), some slippage of the tape that tends to occur between a capstan roller and a pinch roller at a starting time results in an error in the recording start position. In the case of the method (iv), no tracking control signal is obtainable from a part where a change occurs in the recording pattern. Therefore, while this shortcoming is ignorable for a servo device of a slow responsivity, the servo device would momentarily go astray. Every one of these methods thus has presented a problem.

Further, for attaining the above stated purpose, it is also conceivable to multiplex some suitable mark signal with the analog video signal. However, the analog video signal then would be affected by that arrangement.

SUMMARY OF THE INVENTION

It is a principal object of this invention to solve all the above stated problems of the prior art.

It is another object of this invention to provide a video signal recording apparatus which permits adequate concatenated recording without any adverse effect on the analog video signal to be recorded thereby.

Under this object, a video signal recording apparatus which is arranged as an embodiment of this invention comprises: recording means for recording an analog video signal by obliquely forming recording tracks on a tape shaped recording medium within a first area which extends in the longitudinal direction of the medium and for recording a digital audio signal by obliquely forming recording tracks in a second area which extends in parallel to the first area; first control means for generating an instruction signal for causing the recording means to stop recording the video and audio signals; second control means for causing, in response to the instruction signal, the recording means to record, in the second area, control data indicative a pause made in recording; reproducing means for reproducing the control data from the second area; and third control means for causing the recording means to begin recording the video and audio signals on the basis of the control data reproduced by the reproducing means.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
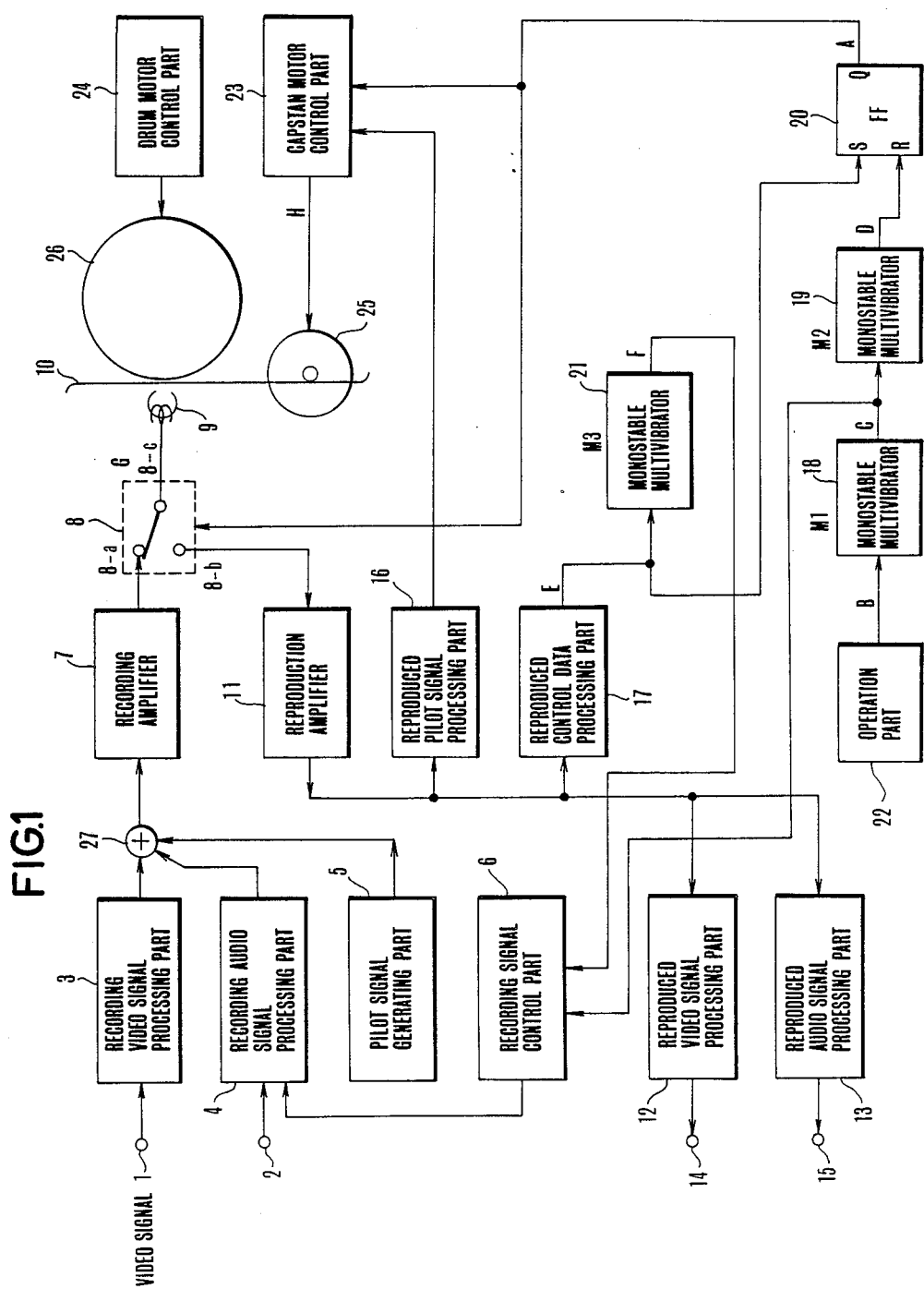
FIG. 1 is a block diagram showing in outline a recording and/or reproducing apparatus arranged according to this invention as an embodiment thereof.
Figure 2:
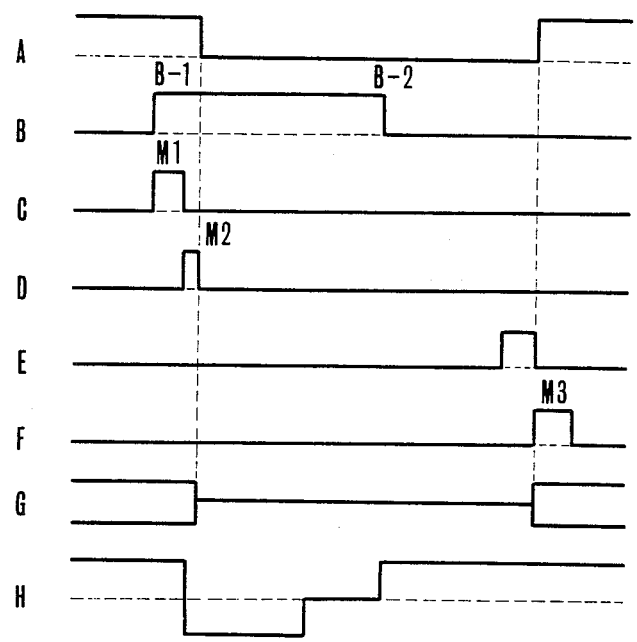
FIG. 2, consisting of A-H, is a timing chart showing the operation of the apparatus shown in FIG. 1.
Figure 3:
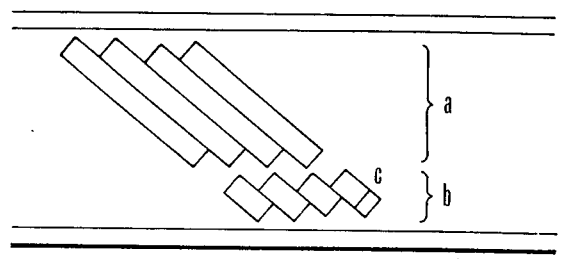
FIG. 3 is an illustration of a tape shaped recording medium in a state of being recorded.

An embodiment of this invention is described below with reference to the accompanying drawings:

FIG. 1 shows in a block diagram and in outline a recording and/or reproducing apparatus embodying this invention. FIG. 2 shows in a timing chart the operation of the same apparatus. FIG. 3 shows a recording pattern obtained on a tape shaped recording medium.

Referring to FIG. 3, a reference symbol "a" denotes a recording area for an analog video signal; a symbol "b" denotes a recording area for a pulse code modulated (PCM) audio signal; and a symbol "c" denotes a recording position for ID data. The ID data is an added information data which is to be recorded along with audio data. The audio data and the ID data are signal processed with other redundant data and are then recorded in the area "b".

Referring to FIG. 1, the illustration includes input terminals 1 and 2 which are arranged to receive the analog video signal and the audio signal; a recording video signal processing part 3 which is arranged to frequency-modulate a luminance signal and to low band convert a chrominance signal; a recording audio signal processing part 4 which is arranged to analog-to-diginal (A/D) convert the audio signal received from the terminal 2 and to time-base convert it into a PCM signal; a pilot signal generating part 5 which is arranged to generate pilot signals to be used for tracking control in a known four-frequency method; and a recording signal control part 6 which is arranged to generate the above stated ID data and to supply it to the recording audio signal processing part 4. The pilot signals from the pilot signal generating part 5 and signals produced from the recording video signal processing part 3 and the recording audio signal processing part 4 are combined by an adder 27 into a composite signal. The signal from the adder 27 is amplified by a recording amplifier 7. The output of the recording amplifier 7 is supplied to a rotary head 9 via the terminals 8-a and 8-c of a switch 8 to be recorded by the head 9 on a tape 10. In this instance, as shown in FIG. 3, the analog video signal is recorded within the area "a" on the tape 10. The PCM audio signal which includes the ID data and is time-base compressed is recorded within the area "b". The pilot signals are recorded in the whole area across the width of the tape. A drum motor control part 24 is arranged to control the rotation of a drum 26. A capstan motor control part 23 is arranged to control a capstan motor 25. These parts operate in the same manner as those of the conventional apparatus.

A reproduction amplifier 11 is arranged to amplify signals reproduced by the head 9. Of the signals produced from the amplifier 11, a reproduced video signal is processed by a reproduced video signal processing part 12. A terminal 14 is arranged to output the reproduced video signal which is processed by the part 12. A reproduced audio signal processing part 13 is arranged to process a reproduced PCM audio signal. A terminal 15 is arranged to output an analog audio signal which is produced from the processing part 13. A known reproduced pilot signal processing part 16 is arranged to detect the tracking error of the capstan by a known method. A reproduced control data processing part 17 is arranged to process control data which is included in reproduced ID data as will be further described later. The embodiment is provided further with monostable multivibrators 18, 19 and 21 (hereinafter referred to as MMs); and a flip-flop 20 (hereinafter referred to as FF).

With the apparatus arranged as described above, when a recording pause signal which is as shown at a part B of FIG. 2 is generated at an operation part 22 while the apparatus is recording the video and audio signals, the MM 18 generates, at a rise part B-1 of the signal B, a pulse of a duration as much as a recording length of time M1 as shown at a part C of FIG. 2. This signal C is supplied to the recording signal control part 6. The control part 6 then generates control data indicative of a pause of recording as a part of the above stated ID data. The control data is then supplied to the recording audio signal processing part 4. The part 4 processes the ID data together with audio data to obtain a digital recording signal. The digital recording signal is recorded via the recording amplifier 7 within the PCM audio signal recording area "b" on the tape. At this time, the ID data is recorded in the above stated ID signal recording position "c". Further, the output C of the MM 18 is supplied also to another MM 19. The MM 19 then generates a signal D which has a pulse width of a length of time M2 which permits detection as to the presence or absence of the above stated control data during a reproducing operation. The FF 20 is reset by this signal D. The FF 20 produces a signal A as shown in FIG. 2 The signal A is supplied to the switch 8 to cause the connecting position of the switch 8 which is on the side of the terminal 8-a during recording to be shifted to another terminal 8-b. With the position of the switch 8 thus shifted, recording current supply is cut off. The connection of the head 9 is switched from the recording amplifier 7 over to the reproduction amplifier 11.

Therefore, a period of time M1+M2 is necessary after an instruction is produced from the operation part for a pause of recording and before the recording current G is actually cut off as shown in FIG. 2. After the recording current G is cut off, the capstan control part 23 produces a driving signal as represented by a signal H in FIG. 2 in accordance with a signal produced from the FF 20. The signal H causes a capstan motor 25 to rotate reversely. As a result, the tape 10 is rewound for a given length of time and then comes to a stop and remains in repose until the pause of recording is canceled by an operation on the operation part 22. Next, when an instruction is produced from the operation part 22 for cancellation of the recording pause at a fall part B-2 of the recording pause signal B, the driving signal H for the capstan motor 25 rotates forward as shown in FIG. 2. This causes the tape 10 to begin to travel in the recording direction. Then, a tracking error signal, i.e. a capstan phase error signal, which is detected by the reproduced pilot signal processing part 16 controls the capstan motor 25 via a capstan motor control part 23 to bring the head into an on-track state. The output of the reproduction amplifier 11 is fed to the reproduction control data processing part 17. The part 17 then detects the control data which has been recorded as shown in FIG. 2. A pulse signal E which is generated in accordance with the control data detected is supplied to the FF 20. The output signal A of the FF 20 is set by this signal E. The position of the switch 8 is then shifted to the terminal 8-a to allow the recording current G to be supplied. Further, the signal E excites the MM 21 to determine a recording period of time M3 for recording control data which is indicative of the start of recording as represented by a signal F shown in FIG. 2. The MM 21 thus produces the signal F having a pulse indicating the time M3. The signal F is fed to a recording signal control part 6. The part 6 then forms control data indicative of a recording start part. The control data thus formed is recorded as ID data via the recording audio signal processing part 4 and the recording amplifier 7 at a part of the area "b" on the tape.

Further, with respect to the series of actions described, the video and audio signals to be recorded are preferably produced from terminals 14 and 15 without operating the reproduced video signal processing part 12 and the reproduced audio signal processing part 13.

The concatenated recording can be improved further by arranging the recording current G to be turned on and off in synchronism with pulses which represent the rotating phases of the drum obtained when the head comes to applicable tracks, because such arrangement prevents recording from beginning at an intermediate point of an ensuing track.

The embodiment described is arranged to record the control data immediately before a pause of recording in the digital audio signal recording area; to detect the control data thus recorded; and to begin recording according to the detected control data. Therefore, the embodiment is capable of excellently carrying out concatenated recording without producing any adverse effect on the video signal.

What is claimed is:

1. A video signal recording apparatus comprising:
    (a) recording means for recording an analog video signal by obliquely forming recording tracks on a tape shaped recording medium within a first area which extends in the longitudinal direction of the medium and for recording a digital audio signal by obliquely forming recording tracks in a second area which extends in parallel to said first area;
    (b) first control means for generating an instruction signal for causing said recording means to stop recording said video and audio signals;
    (c) second control means for causing, in response to said instruction signal, said recording means to record, in said second area, control data indicative of a stop made in recording;
    (d) reproducing means for reproducing said control data from said second area; and
    (e) third control means for causing said recording means to start recording said video and audio signals on the basis of said control data reproduced by said reproducing means.

2. An apparatus according to claim 1, wherein said recording means includes a rotary head which is arranged to transversely trace the surface of said recording medium across said first and second areas and to be capable of recording said control data along with said analog video signal and said digital audio signal.

3. An apparatus according to claim 1, further comprising moving means for moving said tape-shaped recording medium in the longitudinal direction thereof.

4. An apparatus according to claim 3, wherein said second control means is arranged to cause said recording means to make a stop in recording said video and audio signals after causing said recording means to record said control data for a given period of time in response to said instruction signal.

5. An apparatus according to claim 4, wherein said second control means is arranged to cause said moving means to reverse the recording medium moving direction after causing said recording means to make a stop in recording said video and audio signals.

6. An apparatus according to claim 5, wherein said second control means is arranged to cause said moving means to bring the recording medium moving action thereof to a stop after the lapse of a given period of time from a point of time when the recording medium moving direction of the moving means is reversed.

7. An apparatus according to claim 3, further comprising instruction means arranged to generate an instruction signal for instructing said recording means to start to record said video and audio signals; and wherein said third control means is arranged to cause, in response to said instruction signal, said moving means to start to move said recording medium.

8. An apparatus according to claim 7, wherein said instruction means is arranged to be capable of producing said instruction signal in response to a manual operation.

9. An apparatus according to claim 3, wherein said first control means is arranged to generate said instruction signal in response to a manual operation.

10. An apparatus according to claim 3, further comprising means for generating pilot signals for tracking control and for causing said recording means to record said pilot signals o said recording medium.

11. An apparatus according to claim 10, further comprising tracking control means for controlling the recording medium moving action of said moving means on the basis of signals reproduced by said reproducing means.

12. A control method for a video signal recording apparatus, comprising:
    (a) a step of longitudinally moving a tape-shaped recording medium, recording an analog video signal on said medium by obliquely forming recording tracks on said medium within a first area extending in the longitudinal direction of said medium and recording a digital audio signal also on said medium by obliquely forming tracks in a second area extending in parallel to said first area;
    (b) a step of giving an instruction for making a stop in the recording actions of said step (a);
    (c) a step of recording, in said second area, control data indicative of said recording stop int he response to said instruction for making a stop in recording;
    (d) a step of bringing said recording to a stop after said control data is recorded;
    (e) a step of reversing the recording medium moving direction after said recording comes to have a stop;
    (f) a step of bringing a recording medium moving action to a stop when a given period time lapses after the medium moving direction is reversed;
    (g) a step of giving an instruction for a start of said recording;
    (h) a step of begining to move said recording medium in response to said instruction for a start of recording; and
    (i) a step of starting said recording when said control data is reproduced after the start of movement of said recording medium.

* * * * *